(12) United States Patent
Burke et al.

(10) Patent No.: US 10,858,453 B2
(45) Date of Patent: Dec. 8, 2020

(54) STABILIZED COMPOSITION FOR COMBINED ODOR CONTROL AND ENHANCED DEWATERING

(71) Applicant: International Dioxcide, Inc., North Kingstown, RI (US)

(72) Inventors: Adrian Alan Burke, North Kingstown, RI (US); Scott C. Glynn, Coventry, RI (US); Michael C. Trottier, Saunderstown, RI (US)

(73) Assignee: International Dioxcide, Inc., North Kingstown, RI (US)

( * ) Notice: Subject to any disclaimer, the term of this patent is extended or adjusted under 35 U.S.C. 154(b) by 65 days.

(21) Appl. No.: 15/562,964

(22) PCT Filed: Mar. 11, 2016

(86) PCT No.: PCT/US2016/022010
§ 371 (c)(1),
(2) Date: Sep. 29, 2017

(87) PCT Pub. No.: WO2016/160310
PCT Pub. Date: Oct. 6, 2016

(65) Prior Publication Data
US 2018/0112014 A1    Apr. 26, 2018

Related U.S. Application Data

(60) Provisional application No. 62/141,417, filed on Apr. 1, 2015.

(51) Int. Cl.
| | |
|---|---|
| C08B 37/00 | (2006.01) |
| C08B 37/16 | (2006.01) |
| C08L 5/16 | (2006.01) |
| D21H 17/24 | (2006.01) |
| D21H 17/66 | (2006.01) |
| D21H 17/00 | (2006.01) |
| D21H 21/06 | (2006.01) |
| C08K 3/16 | (2006.01) |

(52) U.S. Cl.
CPC ............ *C08B 37/0015* (2013.01); *C08L 5/16* (2013.01); *D21H 17/24* (2013.01); *D21H 17/66* (2013.01); *D21H 17/74* (2013.01); *D21H 21/06* (2013.01); *C08K 2003/162* (2013.01)

(58) Field of Classification Search
CPC ..... C08K 2003/162; C08L 5/16; D21H 17/24; D21H 17/66; D21H 17/74; D21H 21/06; C08B 37/0015
See application file for complete search history.

(56) References Cited

U.S. PATENT DOCUMENTS

| | | | |
|---|---|---|---|
| 3,420,788 A | 1/1969 | Solms | |
| 4,541,986 A * | 9/1985 | Schwab | C02F 1/722 422/5 |
| 2008/0135194 A1* | 6/2008 | Banerjee | D21C 9/08 162/10 |
| 2015/0129506 A1* | 5/2015 | Snead | C02F 1/5272 210/705 |

FOREIGN PATENT DOCUMENTS

| | | |
|---|---|---|
| CN | 101623238 A | 1/2010 |
| CN | 101703071 A | 5/2010 |
| WO | 0148025 A1 | 7/2001 |
| WO | 2007001474 A1 | 1/2007 |
| WO | 2011146689 A1 | 11/2011 |
| WO | 2013078500 A1 | 6/2013 |

* cited by examiner

*Primary Examiner* — Taiwo Oladapo
(74) *Attorney, Agent, or Firm* — Haukaas Fortius PLLC; Michael H. Haukaas

(57) ABSTRACT

A composition comprising a compound mixture dissolved in water, the compound mixture comprising at least one chlorite salt at least one cyclodextrin; and at least one alkaline base; provided that the cyclodextrin is in an amount of 0.13 to 13 parts by mass for every 50 parts by mass of chlorite anion $ClO_2^-$, and the alkaline base is in an amount of up to 13 parts by mass for every 50 parts by mass of chlorite anion $ClO_2^-$; wherein the composition has a pH of at least 12.5. A process for forming the composition and process for treating suspensions of particles with the composition are also disclosed.

13 Claims, No Drawings

STABILIZED COMPOSITION FOR COMBINED ODOR CONTROL AND ENHANCED DEWATERING

FIELD OF THE INVENTION

The present invention relates to an aqueous composition for odor control and enhanced dewatering that exhibits superior storage stability. The composition contains a compound mixture dissolved in water, the compound mixture containing chlorite salt, cyclodextrin, and alkaline base.

BACKGROUND OF THE INVENTION

Sodium chlorite solutions can be used to selectively oxidize sulfide and other malodorous compounds. Such processes are described in U.S. Pat. No. 5,082,576.

Compositions containing cyclodextrins have been applied to biological sludge to enhance the dewatering process. Such compositions are described in U.S. Pat. No. 7,718,075, where the dewatering process is improved, especially when cationic polymers are also used.

BRIEF SUMMARY OF THE INVENTION

Previous compositions and processes have not, however, provided a single feed composition that provides both superior odor control and enhanced dewatering, due to storage instability. The present invention discloses compositions that provide enhanced odor control and dewatering to a particle suspension in a single feed, where the composition has superior storage stability. With the ability to combine cyclodextrin into the chlorite solution, a single liquid feed not only serves its primary function for odor abatement, but it can also enhance the dewatering process by producing drier cake, facilitating optimum belt press efficiency and possibly decreasing the amount of polymer required. This would be of value to facilities that dewater sludge and/or pulp, since hauling, landfilling, and incineration fuel and energy could be reduced.

The present invention relates to a composition comprising a compound mixture dissolved in water, the compound mixture comprising: (a) at least one chlorite salt $ClO_2^-M^+$; (b) at least one cyclodextrin; and (c) at least one alkaline base; provided that the cyclodextrin is in an amount of 0.13 to 13 parts by mass for every 50 parts by mass of the chlorite anion $ClO_2^-$, and the alkaline base is in an amount of up to 13 parts by mass for every 50 parts by mass of the chlorite anion $ClO_2^-$; and wherein M is an alkali or alkaline earth metal; and the composition has a pH of at least 12.5.

In another aspect, the invention relates to a process for producing a composition with improved stability, the process comprising: (a) mixing at least one alkaline base with an aqueous solution of at least one chlorite salt $ClO_2^-M^+$ to form a first mixture; and (b) subsequently dissolving at least one first cyclodextrin into the first mixture to form a second mixture having a pH of at least 12.5; provided that the cyclodextrin is in an amount of 0.13 to 13 parts by mass for every 50 parts by mass of the chlorite anion $ClO_2^-$, and the alkaline base is in an amount of up to 13 parts by mass for every 50 parts by mass of the chlorite anion $ClO_2^-$; and wherein M is an alkali or alkaline earth metal.

In a third aspect, the invention relates to a process for treating suspensions of particles comprising contacting the suspension of particles with a composition comprising a compound mixture dissolved in water, the compound mixture comprising: (a) at least one chlorite salt $ClO_2^-M^+$; (b) at least one cyclodextrin; and (c) at least one alkaline base; provided that the cyclodextrin is in an amount of 0.13 to 13 parts by mass for every 50 parts by mass of the chlorite anion $ClO_2^-$, and the alkaline base is in an amount of up to 13 parts by mass for every 50 parts by mass of the chlorite anion $ClO_2^-$; and wherein M is an alkali or alkaline earth metal; and the composition has a pH of at least 12.5.

DETAILED DESCRIPTION OF THE INVENTION

Herein trademarks are shown in upper case.

As used herein, all weight percentages (wt. %) are based on the total weight of the composition comprising water and the compound mixture, unless otherwise specified. Additionally, all composition percentages are based on totals equal to 100 wt. % unless otherwise specified.

In a first aspect, the invention relates to a composition comprising a compound mixture dissolved in water, the compound mixture comprising: (a) at least one chlorite salt $ClO_2^-M^+$; (b) at least one cyclodextrin; and (c) at least one alkaline base; provided that the cyclodextrin is in an amount of 0.13 to 13 parts by mass for every 50 parts by mass of the chlorite anion $ClO_2^-$, and the alkaline base is in an amount of up to 13 parts by mass for every 50 parts by mass of the chlorite anion $ClO_2^-$; and wherein M is an alkali or alkaline earth metal; and the composition has a pH of at least 12.5.

The chlorite salt $ClO_2^-M^+$ can be any chlorite salt, or mixtures thereof, which is soluble in water. In one embodiment, the chlorite salt is selected from alkali or alkaline earth metal chlorites. Examples include, but are not limited to, sodium chlorite, calcium chlorite, potassium chlorite, or mixtures thereof. In one embodiment, the chlorite salt is used in an amount of at least about 10 wt. %, based on the total weight of the composition; in another embodiment, the chlorite salt is used in an amount of about 15 to 35 wt. %, and in a third embodiment, the chlorite salt is used in an amount of about 20 to 30 wt. %.

The cyclodextrin can be any water-soluble cyclodextrin compound. Cyclodextrins are preferred over other types of flocculant and coagulant aids in this invention due to their cyclic structure, interior hydrophobic core, and hydrophilic exterior. Such structures are found to provide three to five times more resistance to non-enzymatic hydrolysis when compared with linear dextrins and offer adequate solubility and stability over the range of intended storage conditions (0 to 50° C.) when used in the composition of the invention. When compared with other coagulants and coagulant aids, it has been found that cyclodextrins also degrade slower, form fewer precipitates in solution, and react less with chlorite salts. In one embodiment, the cyclodextrin is α-cyclodextrin, β-cyclodextrin, γ-cyclodextrin, or mixtures thereof. In another embodiment, the cyclodextrin is a derivative of α-, β-, γ-cyclodextrin, or mixtures thereof. Such derivatives include hydroxyalkyl cyclodextrins, including but not limited to hydroxyalkyl α-cyclodextrin, hydroxyalkyl β-cyclodextrin, hydroxyalkyl γ-cyclodextrin, or mixtures thereof. One specific example of hydroxyalkyl cyclodextrins includes but is not limited to hydroxypropyl β-cyclodextrin. In this invention, it has been found that β-cyclodextrin, for example, can enhance belt press operation by facilitating the dewatering process optimization, by reducing the water content of the cake by 5% on average.

Of the compound mixture, the cyclodextrin is used in an amount of 0.13 to 13 parts by mass for every 50 parts by mass of the chlorite anion $ClO_2^-$. In another embodiment, the cyclodextrin is used in an amount of 1.3 to 6.7 parts by mass for every 50 parts by mass of the chlorite anion $ClO_2^-$ salt; and in a third embodiment, the cyclodextrin is used in an amount of 1.3 to 2.7 parts by mass for every 50 parts by mass of the chlorite anion $ClO_2^-$. When compared to the weight of the total aqueous composition, the cyclodextrin is used in an amount of 0.1 to 5 wt. %; in another aspect, the cyclodextrin is used in an amount of 0.1 to 3 wt. %; and in a third aspect, the cyclodextrin is used in an amount of 0.5 to 2 wt. %.

The alkaline base can be any water-soluble alkaline base capable of maintaining the composition at a pH of at least 12.5, inclusive. Examples include but are not limited to alkali metal hydroxides, alkali metal metasilicates, alkali metal phosphates, or mixtures thereof. More specifically, examples include but are not limited to sodium hydroxide, calcium hydroxide, potassium hydroxide, sodium metasilicate, trisodium phosphate, or mixtures thereof. Of the compound mixture, the alkaline base is used in an amount of up to 13 parts by mass for every 50 parts by mass of the chlorite anion $ClO_2^-$. In another embodiment, the alkaline base is used in an amount of 1.3 to 13 parts by mass for every 50 parts by mass of the chlorite anion $ClO_2^-$ salt; and in a third embodiment, the alkaline base is used in an amount of 4 to 9 parts by mass for every 50 parts by mass of the chlorite anion $ClO_2^-$. When compared to the weight of the total aqueous composition, the alkaline base is used in an amount of 0.2 to 6 wt. %; in another aspect, the alkaline base is used in an amount of 0.5 to 5 wt. %; and in a third aspect, the alkaline base is used in an amount of 0.8 to 3 wt. %.

In this invention, it has been discovered that a composition at a pH of 12.5 provides superior storage stability, reduced chlorine dioxide formation, and reduced cyclodextrin degradation. While not wishing to be bound to the theory, it is possible that the improved stability of the cyclodextrin leads to improved chlorite salt stability, since the degradation of cyclodextrin could promote acidic species thus lowering pH. The initial composition pH may also be above 12.5, such as at least 12.7, at least 13, or at least 13.5, to allow for a small amount of pH drift.

The composition of the invention is capable of preventing chlorine dioxide formation during storage at ambient, as well as elevated, temperatures. Prevention of chlorine dioxide formation during storage is important, since chlorine dioxide is toxic and potentially explosive. In one embodiment of the invention, the composition is capable of preventing the formation of chlorine dioxide when held at a temperature of up to 54° C. Stabilization of the composition ensures that the composition can still be used for its primary purpose of odor control even if the cyclodextrin has been degraded, by age or excessive heat, to levels too low to achieve dewatering enhancement. In one aspect, the composition is capable of retaining at least 25% of the original cyclodextrin content after three weeks of storage at a temperature of at least 54° C. In one aspect, the composition is capable of retaining at least 50% of the original cyclodextrin content after three weeks of storage at a temperature of at least 40° C.; in another aspect, the composition is capable of retaining at least 70% of the original cyclodextrin content after three weeks of storage at a temperature of at least 40° C.; and in a third aspect, composition is capable of retaining at least 75% of the original cyclodextrin content after three weeks of storage at a temperature of at least 40° C.

As described above, the composition comprises water and a defined solubilized compound mixture. However, additional compounds may also be included in the overall composition. Of most interest are lipophilic molecules such as essential oils and plant extracts that form inclusion compounds with cyclodextrins. Cyclodextrin inclusion compounds may be any compounds capable of forming water-soluble complexes with cyclodextrin, including those compounds having antimicrobial or antifungal activity. Such compounds may improve the stability of cyclodextrin by reducing microbial contamination and thus further reducing cyclodextrin degradation. For example, lipophilic molecules, including essential oils and plant extracts, may be used. Specific examples include but are not limited to trans-cinnamaldehyde, cinnamon bark extract, eugenol, clove bud extract, or mixtures thereof. In one embodiment, an inclusion compound is used in an amount of about 0.001 to 1 wt. %, based on the total weight of the composition; in another embodiment, the inclusion compound is used in an amount of 0.001 to 0.5 wt. %; and in a third embodiment, the inclusion compound is used in an amount of 0.001 to 0.1 wt. %.

The compositions may be produced by any conventional mixing method, and the components may be mixed in any order capable of forming the proper composition at a pH of at least 12.5. In one embodiment of the invention, the invention relates to a process for producing a composition with improved stability, the process comprising: (a) mixing at least one alkaline base with an aqueous solution of at least one chlorite salt $ClO_2^-M^+$ to form a first mixture; and (b) subsequently dissolving at least one first cyclodextrin into the first mixture to form a second mixture having a pH of at least 12.5; provided that the cyclodextrin is in an amount of 0.13 to 13 parts by mass for every 50 parts by mass of the chlorite anion $ClO_2^-$, and the alkaline base is in an amount of up to 13 parts by mass for every 50 parts by mass of the chlorite anion $ClO_2^-$; and wherein M is an alkali or alkaline earth metal. In one example, the alkaline base is mixed with an aqueous chlorite salt at a rate suitable to avoid excess temperature, such as a rate capable of maintaining a temperature within 10° C. above ambient temperature. The cyclodextrin is then added to the alkaline base/chlorite salt solution. The formulation of the composition may be verified by measuring pH, density, chlorite wt. %, and cyclodextrin wt. %.

When an inclusion compound is used, the inclusion compound may be mixed separately with at least one second cyclodextrin and water with heat to form a third mixture. The inclusion compound mixture may then be added to the second mixture containing alkaline base, cyclodextrin, and chlorite salt. The third mixture may be added directly, or the inclusion complex may be isolated by extraction, freeze-drying, or other separation method before adding to the second mixture. When forming the third mixture, a temperature such as 60° C. may be used, and the third mixture is generally mixed for at least 1 day, and sometimes 3 to 4 days to ensure proper complexing between the cyclodextrin(s) and inclusion compound(s). The first cyclodextrin and second cyclodextrin may be the same or different. In one embodiment, the first cyclodextrin and second cyclodextrin are independently selected from α-cyclodextrin, β-cyclodextrin, γ-cyclodextrin, hydroxyalkyl α-cyclodextrin, hydroxyalkyl β-cyclodextrin, hydroxyalkyl γ-cyclodextrin, or mixtures thereof.

The compositions of the invention are useful for odor control and enhanced dewatering of suspended particulate matter. In one aspect, the invention relates to a process for treating suspensions of particles comprising contacting the suspension of particles with a composition comprising a compound mixture dissolved in water, the compound mixture comprising: (a) at least one chlorite salt $ClO_2^-M+$; (b) at least one cyclodextrin; and (c) at least one alkaline base;

provided that the cyclodextrin is in an amount of 0.13 to 13 parts by mass for every 50 parts by mass of the chlorite anion $ClO_2^-$, and the alkaline base is in an amount of up to 13 parts by mass for every 50 parts by mass of the chlorite anion $ClO_2^-$; and wherein M is an alkali or alkaline earth metal; and the composition has a pH of at least 12.5. The composition is added to the suspension of particles as one feed. In one embodiment, the suspension of particles is chosen from a biological sludge, a non-biological sludge, or a pulp fiber suspension. In one embodiment, the process additionally includes the steps of using an in-line sensor that measures the weight percent solids of the sludge stream being treated; an in-line sensor that measures the volumetric or mass flow rate of the sludge stream being treated; and an automated dosing system that uses a pump, PLC, and control algorithm to adjust and optimize dosing based upon real-time measurements of the sludge solids being processed. The composition of the invention may be used to increase the rate of dewatering the particle cake formed from the particle suspension.

Materials and Test Methods

Unless otherwise specified, all cyclodextrin and trans-cinnamaldehyde reagents and compounds were obtained from Sigma-Aldrich, St. Louis, Mo. Liquid sodium chlorite solutions were obtained from ADOX Water Technologies, North Kingstown, R.I. The sodium hydroxide solution was obtained from Roberts Chemical Company, Inc., Attleboro, Mass.

Chlorite concentrations were measured by iodometric titration, and cyclodextrin concentrations were analyzed using high performance liquid chromatography with evaporative light scattering detection (HPLC-ELSD).

Chlorine dioxide evolution was analyzed by BW Gas Alert Extreme $ClO_2^-$ or ATI series F12 gas detector.

The examples are illustrative of compositions having improved stability and are not intended to be limitations thereon.

Examples 1 and 2

Sodium chlorite ($NaClO_2$), β-cyclodextrin (BCD), and sodium hydroxide (NaOH) were mixed with water in a large batch according to the amounts in Table 1. Aliquots (20 mL) were charged in glass vials with TEFLON-coated caps. Samples at 40° C. and 54° C. were also wrapped in paraffin wax film to prevent water evaporation. Samples were placed into storage at 30, 40, and 54° C. Vials were opened once per week and tested for $ClO_2$ emissions, chlorite wt. %, and pH. At the end of the 3-week period, the samples were also tested for BCD wt. %.

TABLE 1

Composition and Performance

| Ex. | 1 | | | 2 | | | 3 | A | B |
|---|---|---|---|---|---|---|---|---|---|
| Initial Composition and Properties | | | | | | | | | |
| $NaClO_2$ (wt. %) | 29 | | | 29 | | | 22 | 31 | 23 |
| BCD (wt. %) | 0.75 | | | 0.84 | | | 1.64 | 0.75 | 0.62 |
| NaOH (wt. %) | 1.8 | | | 2.8 | | | 3.0 | — | — |
| ClN (wt. %) | — | | | — | | | 0.008 | — | — |
| pH | 13.2 | | | 13.2 | | | 13.3 | 12.7 | 12.6 |
| Final Properties | | | | | | | | | |
| Storage Temp. (° C.) | 54 | 40 | 30 | 54 | 40 | 30 | 40 | 54 | 54 |
| $NaClO_2$ (wt. %) | 29 | 29 | 29 | 29 | 29 | 29 | 23 | 3 | 5 |
| BCD (wt. %) | 0.21 | 0.57 | 0.61 | 0.26 | 0.68 | 0.77 | 1.41 | 0 | 0 |
| pH | 13.2 | 13.2 | 13.2 | 13.2 | 13.2 | 13.2 | 13.3 | 7 | 6.5 |
| % CD Retained | 28 | 76 | 81 | 31 | 81 | 92 | 86 | 0 | 0 |
| $ClO_2$ produced | N | N | N | N | N | N | N | Y | Y |

Example 3

The procedure of Examples 1 and 2 was repeated, except that trans-cinnamaldehyde (ClN) was also added. An inclusion complex mixture was formed by dissolving BCD and ClN into DI water at 60° C. This solution was stirred and held at temperature for 3 days before addition to the chlorite solution.

Comparative Examples A-B

The procedure of Examples 1 and 2 was repeated, except that sodium hydroxide was not included.

Example 4

The procedure of Examples 1 and 2 was repeated, except that β-hydroxypropyl cyclodextrin (BHPCD) was used.

Comparative Example C

The procedure of Example 4 was repeated, except that sodium hydroxide was not included.

TABLE 2

Composition and Performance of Examples 4 and Comparative Example C

| | Example | |
|---|---|---|
| | 4 | C |
| Initial Composition and Properties | | |
| NaClO$_2$ (wt. %) | 28 | 28 |
| BHPCD (wt. %) | 0.79 | 0.80 |
| NaOH (wt. %) | 1.8 | — |
| pH | 13.3 | 12.7 |
| Final Properties | | |
| Storage Temp. (° C.) | 54 | 54 |
| NaClO$_2$ (wt. %) | 28 | 18 |
| BHPCD (wt. %) | Not analyzed | Not analyzed |
| pH | 13.3 | 6.5 |
| % CD Retained | Not analyzed | Not analyzed |
| ClO$_2$ produced | N | Y |

Example 5

The procedure of Example 3 was repeated, except that the BCD concentration used was considerably lower. This simulates a scenario in which BCD, instead of being used for dewatering purposes, is used as a host molecule to enhance the solubility and delivery of an inclusion compound, in this case being trans-cinnamaldehyde.

Comparative Example D

The procedure of Example 5 was repeated, but no sodium hydroxide was added to stabilize the formulation.

TABLE 3

Composition and Performance of Examples 5 and Comparative Example D

| | Example | |
|---|---|---|
| | 5 | D |
| Initial Composition and Properties | | |
| NaClO$_2$ (wt. %) | 24 | 24 |
| BCD (wt. %) | 0.14 | 0.14 |
| NaOH (wt. %) | 0.8 | — |
| CIN (wt. %) | 0.1 | 0.1 |
| pH | 13.1 | 12.7 |
| Final Properties | | | | |
| Storage Temp. (° C.) | 54 | 40 | 54 | 40 |
| BCD (wt. %) | 0.06 | 0.13 | 0 | 0.13 |
| pH | 13.1 | 13.1 | 12.6 | 12.7 |
| % CD Retained | 43 | 93 | 0 | 93 |
| ClO$_2$ produced | N | N | N | N |

Results

Example 1 shows that the samples retained high percentages of the original BCD at all storage temperatures, without chlorite activation. Example 2 suggests that a higher ratio of base can achieve even higher BCD stability. Comparative Examples A, B, and C showed ClO$_2$ generation, whereas Example D, which had a much lower BCD concentration, showed total BCD degradation without ClO$_2^-$ generation. Example 3 exhibited the highest BCD retention at 40° C. (86%), indicating that the inclusion compound enhanced storage stability. Example 4 demonstrated that other cyclodextrins, such as BHPCD, provide similar results to BCD. Example 5 demonstrated that the inventive composition provided retention of BCD at temperatures up to 54° C., while a comparative composition (D) contained undetectable levels of BCD after storage at 54° C. Thus, the examples of the present invention demonstrate compositions that can provide odor control, enhanced dewatering, and/or enhanced solubility of an inclusion compound, while exhibiting superior storage stability.

The invention claimed is:

1. A composition comprising a compound mixture dissolved in water, the compound mixture comprising:
    a) one chlorite salt ClO$_2^-$M$^+$;
    b) at least one cyclodextrin; and
    c) at least one sodium metal alkaline base;
    provided that the cyclodextrin is in an amount of about 1.3 to about 3.7 parts by mass for every 50 parts by mass of the chlorite anion ClO$_2^-$, and the sodium metal alkaline base is in an amount of about 3.1 to about 6.8 parts by mass for every 50 parts by mass of the chlorite anion ClO$_2^-$; and
    wherein M is sodium metal; and the composition has a pH of at least 12.6 after 3 weeks.

2. The composition of claim 1, where the cyclodextrin is chosen from α-cyclodextrin, β-cyclodextrin, γ-cyclodextrin, hydroxyalkyl α-cyclodextrin, hydroxyalkyl β-cyclodextrin, hydroxyalkyl γ-cyclodextrin, or mixtures thereof.

3. The composition of claim 1, where the sodium metal alkaline base is chosen from sodium hydroxide, sodium metasilicate, trisodium phosphate, or mixtures thereof.

4. The composition of claim 1, said composition capable of preventing the formation of chlorine dioxide when held at a temperature of up to 54° C.

5. The composition of claim 1, said composition capable of retaining at least 25% of the original cyclodextrin content after three weeks of storage at a temperature of at least 54° C.

6. The composition of claim 1, said composition capable of retaining at least 70% of the original cyclodextrin content after three weeks of storage at a temperature of at least 40° C.

7. The composition of claim 1, further comprising at least one inclusion compound in an amount of 0.001 to 1% by weight, based on the total weight of the composition.

8. The composition of claim 7, where the inclusion compound is chosen from lipophilic molecules.

9. A process for producing a composition with improved stability, the process comprising:
    a) mixing at least one sodium metal alkaline base with an aqueous solution of one chlorite salt ClO$_2^-$M$^+$ to form a first mixture; and
    b) subsequently dissolving at least one first cyclodextrin into the first mixture to form a second mixture having a pH of at least 12.6 after 3 weeks;
    provided that the cyclodextrin is in an amount of about 1.3 to about 3.7 parts by mass for every 50 parts by mass of the chlorite anion ClO$_2^-$, and the sodium metal alkaline base is in an amount of about 3.1 to about 6.8 parts by mass for every 50 parts by mass of the chlorite anion ClO$_2^-$; and wherein M is sodium metal.

10. The process of claim 9, further comprising:
    c) mixing at least one inclusion compound, at least one second cyclodextrin, and water with heat to form a third mixture; and
    d) subsequently contacting the third mixture with the second mixture;
    provided that the first cyclodextrin and second cyclodextrin may be the same or different.

11. The process of claim 10, where the first cyclodextrin and second cyclodextrin are independently selected from α-cyclodextrin, β-cyclodextrin, γ-cyclodextrin, hydroxyalkyl α-cyclodextrin, hydroxyalkyl β-cyclodextrin, hydroxyalkyl γ-cyclodextrin, or mixtures thereof.

12. A process for treating suspensions of particles comprising contacting the suspension of particles with a composition comprising a compound mixture dissolved in water, the compound mixture comprising:
   a) at least one chlorite salt $ClO_2^-M^+$;
   b) at least one cyclodextrin; and
   c) at least one sodium metal alkaline base;
   provided that the cyclodextrin is in an amount of about 1.3 to about 3.7 parts by mass for every 50 parts by mass of the chlorite anion $ClO_2^-$, and the sodium metal alkaline base is in an amount of about 3.1 to about 6.8 by mass for every 50 parts by mass of the chlorite anion $ClO_2^-$; and
   wherein M is sodium metal; and the composition has a pH of at least 12.6 after 3 weeks.

13. The process of claim 12, where the suspension of particles is chosen from a biological sludge, a non-biological sludge, or a pulp fiber suspension.

\* \* \* \* \*